(12) United States Patent
Berke et al.

(10) Patent No.: US 10,474,384 B2
(45) Date of Patent: Nov. 12, 2019

(54) SYSTEM AND METHOD FOR PROVIDING A BACK DOOR COMMUNICATION PATH BETWEEN CHANNELS ON DUAL-CHANNEL DIMMS

(71) Applicant: DELL PRODUCTS, LP, Round Rock, TX (US)

(72) Inventors: Stuart Allen Berke, Austin, TX (US); Bhyrav M. Mutnury, Round Rock, TX (US); Vadhiraj Sankaranarayanan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 150 days.

(21) Appl. No.: 15/429,751

(22) Filed: Feb. 10, 2017

(65) Prior Publication Data

US 2018/0232171 A1    Aug. 16, 2018

(51) Int. Cl.
*G06F 3/06* (2006.01)
*G06F 13/16* (2006.01)
*G06F 13/40* (2006.01)

(52) U.S. Cl.
CPC .......... *G06F 3/0635* (2013.01); *G06F 3/0619* (2013.01); *G06F 3/0634* (2013.01); *G06F 3/0683* (2013.01); *G06F 13/16* (2013.01); *G06F 13/4068* (2013.01)

(58) Field of Classification Search
None
See application file for complete search history.

(56) References Cited

U.S. PATENT DOCUMENTS

| 6,819,577 | B1 | 11/2004 | Wiktor et al. | |
| 7,368,959 | B1 | 5/2008 | Xu et al. | |
| 8,489,775 | B2 | 7/2013 | Berke et al. | |
| 8,560,772 | B1* | 10/2013 | Piszczek | G06F 11/1076 711/114 |
| 8,850,091 | B1* | 9/2014 | Karamcheti | G06F 12/0246 710/62 |
| 2006/0221690 | A1* | 10/2006 | Rehm | G11C 29/02 365/185.09 |
| 2008/0010435 | A1* | 1/2008 | Smith | G06F 11/1076 712/10 |
| 2012/0023262 | A1 | 1/2012 | Berke et al. | |

(Continued)

OTHER PUBLICATIONS

U.S. Appl. No. 15/331,064, filed Oct. 21, 2016.
U.S. Appl. No. 15/276,240, filed Sep. 21, 2016.

*Primary Examiner* — Henry Tsai
*Assistant Examiner* — Christopher A Bartels
(74) *Attorney, Agent, or Firm* — Larson Newman, LLP (57) ABSTRACT

A dual-channel Dual In-Line Memory Module (DIMM) is configured to provide memory transactions on a first memory channel and a second memory channel. The dual-channel DIMM includes a first bank of Dynamic Random Access Memory (DRAM) devices configured to provide a first memory transaction on the first memory channel, a second bank of DRAM devices configured to provide a second memory transaction on the second memory channel, and a plurality of back door communication paths, each back door communication path being between a data bit of the first bank of DRAM devices and a corresponding data bit of the second bank of DRAM devices.

20 Claims, 9 Drawing Sheets

(56) References Cited

U.S. PATENT DOCUMENTS

| | | | |
|---|---|---|---|
| 2012/0047409 A1* | 2/2012 | Post | G06F 11/1048 714/718 |
| 2014/0089725 A1* | 3/2014 | Ackaret | G06F 12/0653 714/6.1 |
| 2015/0106560 A1* | 4/2015 | Perego | G06F 12/10 711/105 |
| 2016/0071590 A1* | 3/2016 | Hsu | G11C 14/0018 365/185.08 |
| 2016/0232063 A1* | 8/2016 | Das | G06F 3/0619 |
| 2016/0349817 A1* | 12/2016 | Kumar | G06F 1/30 |
| 2016/0350002 A1* | 12/2016 | Vergis | G06F 12/02 |
| 2017/0199830 A1* | 7/2017 | Nale | G06F 13/1673 |
| 2017/0256303 A1* | 9/2017 | Yu | G11C 11/4094 |
| 2017/0285941 A1* | 10/2017 | Nale | G06F 13/16 |

\* cited by examiner

SYSTEM AND METHOD FOR PROVIDING A BACK DOOR COMMUNICATION PATH BETWEEN CHANNELS ON DUAL-CHANNEL DIMMS

FIELD OF THE DISCLOSURE

This disclosure generally relates to information handling systems, and more particularly relates to providing a back door communication path between channels on dual-channel DIMMS.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Memory for an information handling system often includes one or more Dual In-Line Memory Modules (DIMMs). The DIMMs are typically configured in accordance with a particular Double Data Rate (DDR) standard, such as a fourth generation standard (DDR4). A new DDR standard, the fifth generation standard (DDR5) is configured such that the memory devices on a DDR5 DIMM are accessed and controlled via two separate memory channels. A problem may arise in an information handling system that employs DDR5 DIMMs when one of the two channels fails. In this case data stored on the failed channel becomes inaccessible to the information handling system and can lead to a crash of the information handling system.

A dual-channel Dual In-Line Memory Module (DIMM) may be configured to provide memory transactions on a first memory channel and a second memory channel. The dual-channel DIMM may include a first bank of Dynamic Random Access Memory (DRAM) devices configured to provide a first memory transaction on the first memory channel, a second bank of DRAM devices configured to provide a second memory transaction on the second memory channel, and a plurality of back door communication paths, each back door communication path being between a data bit of the first bank of DRAM devices and a corresponding data bit of the second bank of DRAM devices. A fifth generation Double Data Rate (DDR5) DIMM is a particular example of a dual-channel DIMM.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
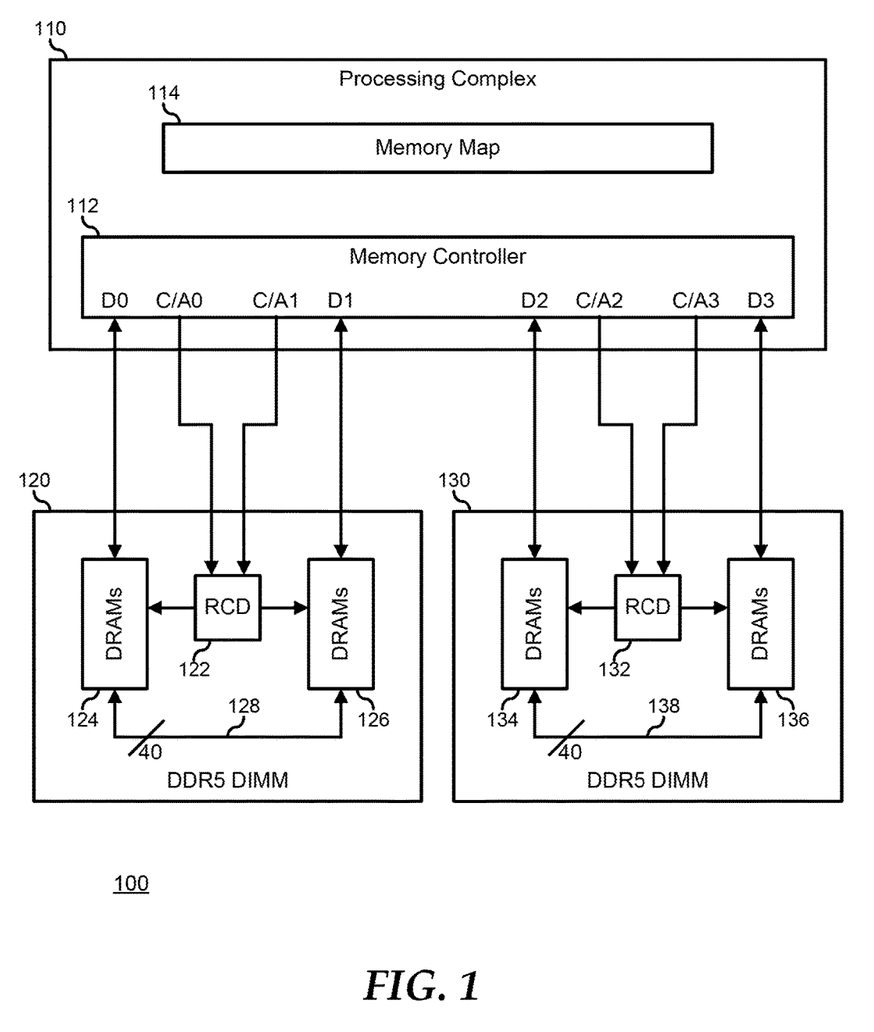
FIG. 1 is a block diagram illustrating an information handling system that has a four-channel architecture, and that includes dual-channel DIMMs that provide a back door communication path according to an embodiment of the present disclosure.

FIG. 1 illustrates an embodiment of an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system can 100 also include one or more buses operable to transmit information between the various hardware components.

Information handling system 100 includes a processing complex 110, dual-channel Dual In-Line Memory Module (DIMM) 120, and a dual-channel DIMM 130. Information handling system 100 is implemented as a four-channel architecture, and that includes dual-channel DIMMs that provide a back door communication path, such that, if one of the four channels fails, the memory locations on the dual-channel DIMM that experienced the channel failure may still be accessed by the information handling system, and data losses due to channel failures can be minimized or eliminated. In a particular embodiment, when a channel fails, information handling system 100 accesses the memory locations associated with the channel failure by performing memory transactions on the non-failing channel. The dual-channel DIMM then accesses the back door communication path provide the memory transactions on the memory locations associated with the channel failure, and responds to the memory transactions on the non-failing channel. In this way, memory operations on information handling system 100 proceed as they would normally, that is, as they would without a channel failure, except that the memory transactions for the memory locations associated with the channel failure may experience an increased latency due to the addition of the back door communication path. In another embodiment, when a channel fails, information handling system 100 access the memory locations associated with the channel failure by performing memory reads to the memory locations on the non-failing channel. Information handling system 100 then stores the data from the memory locations associated with the channel failure at new memory locations, and remaps the memory locations associated with the channel failure to the new memory locations. In this way, after the data is transferred, information handling system 100 may isolate the memory locations associated with the channel failure, thereby eliminating the increased latency due to the addition of the back door communication path. An example of a dual-channel DIMM includes a fifth generation Dual Data Rate (DDR5) DIMM.

Processing complex 110 includes a hardware memory controller 112 and a memory map 114. Processing complex 110 represents the hardware, software, firmware, and other elements associated with the performance of the processing tasks associated with information handling system. As such, processing complex 110 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired. Memory controller 112 represents a device of processing complex 110 that manages the flow of data going to and from dual-channel DIMMS 120 and 130. Memory controller 112 is configured to implement a four-channel architecture. As such, memory controller 112 is connected to dual-channel DIMM 120 via two channels (channels 0 and 1), and is connected to dual-channel DIMM 130 via two additional channels (channels 2 and 3). Each channel includes a data bus (D#) and a control/address bus (C/A#). Memory map 114 is utilized by information handling system 100 in remapping data from memory locations associated with a channel failure to new memory locations, as described further, below.

Dual-channel DIMM 120 includes two separate channels for communicating with memory controller 112. An example of dual-channel DIMM 120 includes an unbuffered DIMM (UDIMM), a registered DIMM (RDIMM), a load reduced DIMM (LRDIMM), a storage class memory (SCM), or another type of fifth generation DIMM. Dual-channel DIMM 120 includes a Register Control Device (RCD) 122, and Dynamic Random Access Memory devices (DRAMs) 124 and 126. DRAMs 124 and 126 are connected together via a back door communication path 128. Dual-channel DIMM 120 is illustrated herein as including RCD 122, and the functions and features of operation of the dual-channel DIMM are illustrated and described within the context of a RDIMM, but this is not necessarily so, and the skilled artisan will understand that the functions and features of operation of a dual-channel DIMM as described herein may be provided in other ways, such as by a Programmable Logic Device (PLD), as needed or desired by the particular design of the dual-channel DIMM. RCD 122 is connected to command/address bus C/A0 and to command/address bus C/A1 to receive command and address information from memory controller 112 for channel 0 and channel 1, respectively. RCD 122 is also connected to DRAMs 124 and DRAMs 126 to provide the command and address information to the DRAMs. DRAMs 124 is connected to data bus D0 to transfer data between DRAMs 124 and memory controller 112, and DRAMs 126 is connected to data bus D1 to transfer data between DRAMs 126 and the memory controller. Finally, DRAMs 124 are connected to DRAMs 126 via back door communication path 128 to transfer data between the DRAMs in the event of a channel failure. More specifically, back door communication path 128 consists of individual communication paths, each communication path connecting a data bit of DRAMs 124 to an associated data bit of DRAMs 126. For example, back door communication path 128 may represent a 40-bit wide communication path to carry 32-bits of memory data, and 8-bits of Error Correcting Code (ECC) data. Note that, back door communication path 128 may represent a wider or a narrower communication path. The skilled artisan will thus understand that back door communication path 128 may represent greater or less than a 40-bit wide communication path, as needed or desired. For example, where dual-channel DIMM 120 is a non-ECC DIMM, back door communication path 128 may represent a 32-bit wide communication path. The operation of back channel communication path 128 is described further, below.

Dual-channel DIMM 130 is similar to dual-channel DIMM 120, including two separate channels for communicating with memory controller 112. Dual-channel DIMM 120 includes a RCD 132 similar to RCD 122, and DRAMs 134 and 136 similar to DRAMs 124 and 126. DRAMs 134 and 136 are connected together via a back door communication path 138 similar to back door communication path 128. RCD 132 is connected to command/address bus C/A2 and to command/address bus C/A3 to receive command and address information from memory controller 112 for channel 2 and channel 3, respectively. RCD 132 is also connected to DRAMs 134 and DRAMs 136 to provide the command and address information to the DRAMs. DRAMs 134 is connected to data bus D2 to transfer data between DRAMs 134 and memory controller 112, and DRAMs 136 is connected to data bus D3 to transfer data between DRAMs 136 and the memory controller. Finally, DRAMs 134 are connected to DRAMs 136 via back door communication path 138 to transfer data between the DRAMs in the event of a channel failure, as described further, below.

In normal operation, memory transactions for memory locations associated with DRAMs 124 are conducted on channel 0, memory transactions for memory locations associated with DRAMs 126 are conducted on channel 1, memory transactions for memory locations associated with DRAMs 134 are conducted on channel 2, and memory transactions for memory locations associated with DRAMs 136 are conducted on channel 3. For example, a memory read to a memory location associated with DRAMs 126 will start with memory controller 112 presenting command and address information on C/A1. RCD 122 will provide the command and address information to DRAMs 126, and the DRAMs will provide the read data from the addressed memory location to memory controller 112 on data bus D1. In another example, a memory write to a memory location associated with DRAMs 134 will start with memory controller 112 presenting command and address information on C/A2 and the write data on data bus D2. RCD 132 will provide the command and address information to DRAMs 134 and the DRAMs will read the data from D2 and store the data to the addressed memory location.

Figure 2:
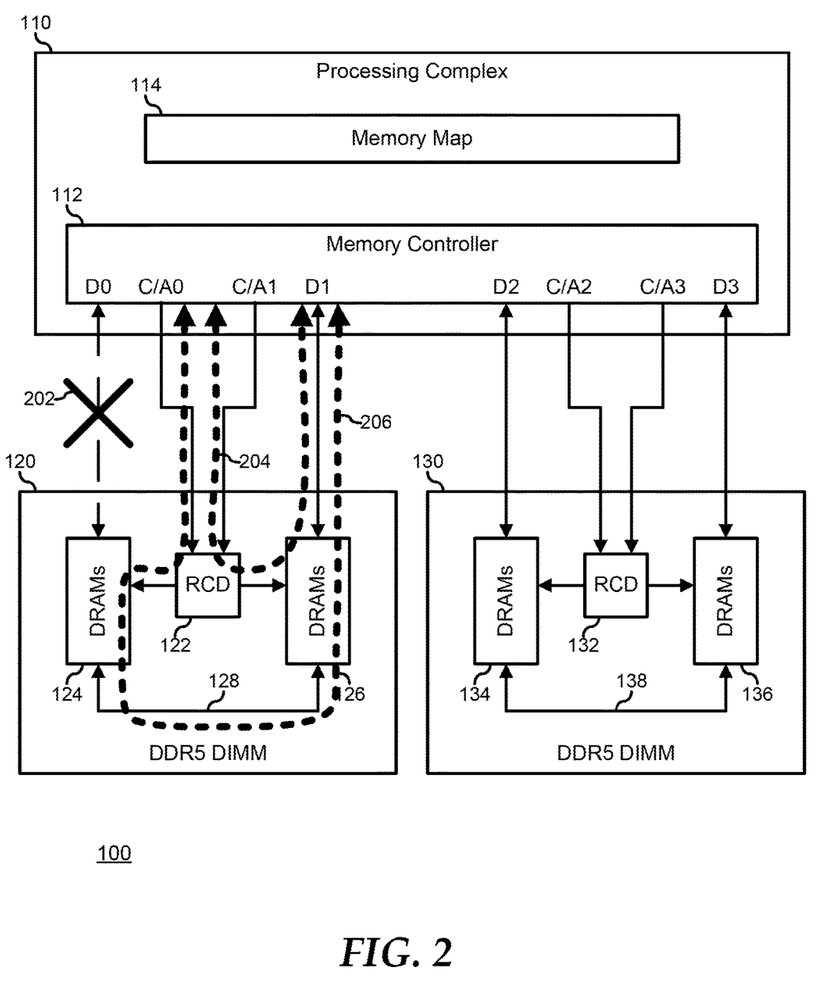
FIG. 2 illustrates a method of utilizing the information handling system of FIG. 1 in the event of a channel failure according to an embodiment of the present disclosure.

FIG. 2 illustrates a method of utilizing information handling system 100 in the event of a channel failure. In the illustrated example, data bus D0 is experiencing a channel failure 202 such that data can no longer be reliably transmitted between memory controller 114 and DRAMs 124. In a particular embodiment, channel failure 202 is detected by memory controller 114. In another embodiment, channel failure 202 is detected by dual-channel DIMM 120, such as where RCD 122 or DRAMs 124 detects the channel failure, and the dual-channel DIMM provides information to memory controller 112 indicating that DDR channel D0 has experienced channel failure 202. An example of channel failure 202 includes a complete loss of signal on one or more data lane of data bus D0, a degradation in performance on one or more data lane of data bus D0, such as an increase in a Bit-Error Rate (BER) for the one or more data lanes, or other failure modes as are known in the art.

When either memory controller 112 or dual-channel DIMM 120 detects channel failure 202, the memory controller enters a High Availability (HA) mode. In the HA mode, a memory transaction that is addressed to a memory location associated with DRAMs 126 proceeds as shown by transaction 204. Here, for example, a memory read to a memory location associated with DRAMs 126 starts with memory controller 112 presenting command and address information on C/A1. RCD 122 provides the command and address information to DRAMs 126, and the DRAMs provide the read data from the addressed memory location to memory controller 112 on data bus D1. Likewise, a memory write to a memory location associated with DRAMs 126 starts with memory controller 112 presenting command and address information on C/A1 and the write data on data bus D1. RCD 122 provides the command and address information to DRAMs 126 and the DRAMs store the write data to the addressed memory location.

Further, in the HA mode, a memory transaction that is addressed to a memory location associated with DRAMs 124 proceeds as shown by transaction 206. Here, for example, a memory read to a memory location associated with DRAMs 124 start with memory controller 112 presenting command and address information on C/A0. RCD 122 provides the command and address information to DRAMs 124, and the DRAMs provide the read data from the addressed memory location to DRAMs 126 via back door communication path 128. RCD 122 also sets DRAMs 126 to a pass-through mode, and DRAMs 126 provide the read data from DRAMs 124 to memory controller 112 on data bus D1. Likewise, a memory write to a memory location associated with DRAMs 124 starts with memory controller 112 presenting command and address information on C/A0 and the write data on data bus D1. RCD 122 provides the command and address information to DRAMs 124 and sets DRAMs 126 to the pass-through mode, and DRAMS 126 provide the write data to DRAMs 124 via back door communication path 128. DRAMs 124 receive the write data from DRAMs 126, and store the data to the addressed memory location.

In a particular embodiment, when channel failure 202 occurs, all activities on channel 0 are halted, including the sending of command and address information on C/A0, and that the HA mode memory reads and writes to DRAM devices 124 are received via command and address information issued on C/A1. In another embodiment, where channel failure 202 involves only data integrity on D0, then command and address information that is directed to DRAM devices 124 may still be received on C/A0.

Figure 3:
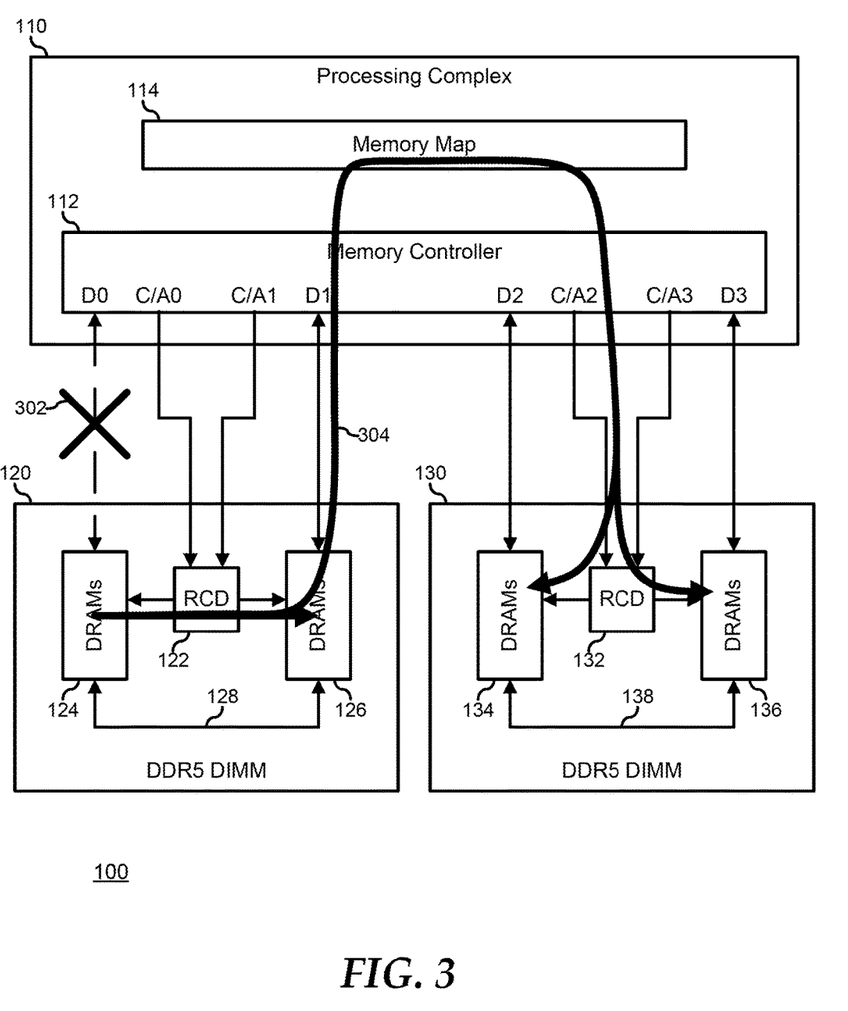
FIG. 3 illustrates another method of utilizing the information handling system of FIG. 1 in the event of a channel failure according to an embodiment of the present disclosure.

FIG. 3 illustrates another method of utilizing information handling system 100 in the event of a channel failure. In the illustrated example, data bus D0 is experiencing a channel failure 302 similar to channel failure 202. As such, data can no longer be reliably transmitted between memory controller 114 and DRAMs 124. When either memory controller 112 or dual-channel DIMM 120 detects channel failure 302, the memory controller enters another High Availability (HA) mode. In this HA mode, the data from memory locations associated with DRAMs 124 are read via the HA mode as described above in FIG. 2, and the data is written to other memory locations, such as in memory locations associated with DRAMs 126, DRAMs 134, or DRAMs 136, as shown by transaction 304. Here, memory map 114 is modified to remap the data from the memory locations associated with DRAMs 124 to the new memory locations. In a particular embodiment, memory map 114 is modified by memory controller 112. In another embodiment, memory map 114 is modified by a system operating environment of processing complex 110, such as a platform Basic Input/Output System (BIOS), a Unified Extensible Firmware Interface (UEFI), an operating system (OS), or the like.

Figure 4:
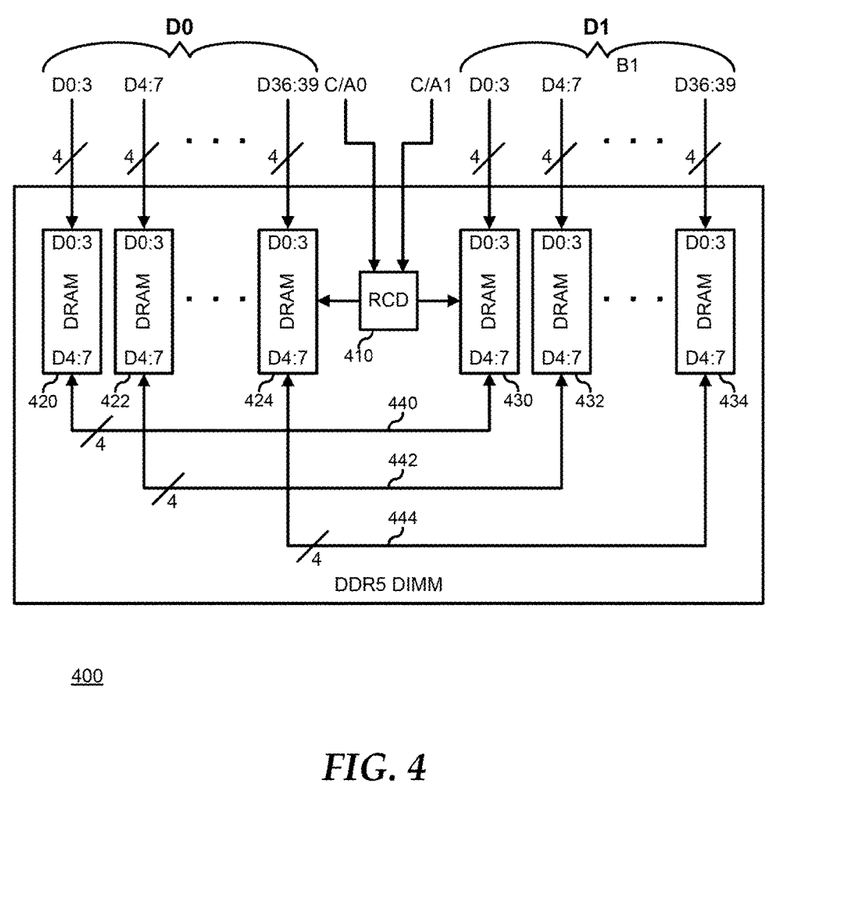
FIG. 4 is a block diagram illustrating a dual-channel DIMM including a back door communication path according to an embodiment of the present disclosure.

FIG. 4 illustrates an embodiment of a dual-channel DIMM 400 that includes a back door communication path. Dual-channel DIMM 400 includes a RCD 410, a first bank of DRAMs including DRAMs 420, 422, and 424 associated with a first DDR channel D0, and a second bank of DRAMs 430, 432, and 434 associated with a second channel D1.

RCD 410 is similar to RCDs 122 and 132, and are configured to receive command and address information for a first channel on a command and address bus C/A0, and command and address information for a second channel on a command and address bus C/A1. In a normal operating mode, RCD 410 provides the command and address information received on the command and address bus C/A0 to DRAMs 420, 422, and 424, and provides command and address information received on the command and address bus C/A1 to DRAMs 430, 432, and 434.

Dual-channel DIMM 400 provides for 64-bits of data storage, and 16-bits of Error Correcting Code (ECC) data, across two 40-bit channels. As illustrated, dual-channel DRAM 400 utilizes 4-bit (×4) DRAMs, such that each bank of DRAMs includes ten ×4 DRAMs that provide 32-bits of data storage and 8-bits of ECC data storage. DRAMs 420, 422, 424, 430, 432, and 434 are each configured with two ports for accessing the data storage on the DRAMs. As such, DRAMs 420, 422, 424, 430, 432, and 434 each include a primary four-bit data port (D0:3), and a secondary four-bit data port (D4:7). Dual-channel DIMM 400 is configured such that the primary data ports on each DRAM are connected to the associated bits of the channel (D0 or D1). As such, the primary port D0:3 of DRAM 420 is connected to data bits D0:3 of channel D0, the primary port D0:3 of DRAM 422 is connected to data bits D4:7 of channel D0, and so on, and the primary port D0:3 of DRAM 424 is connected to data bits D36:39 of channel D0. Similarly, the primary port D0:3 of DRAM 430 is connected to data bits D0:3 of channel D1, the primary port D0:3 of DRAM 423 is connected to data bits D4:7 of channel D1, and so on, and the primary port D0:3 of DRAM 434 is connected to data bits D36:39 of channel D1.

DRAMs 420, 422, 424, 430, 432, and 434 each provide a pass-through mode that passes data received on the primary port D0:3 to the secondary port D4:7 and also passes data received on the secondary port D4:7 to the primary port D0:3. Further, the secondary ports D4:7 of each DRAM in one bank is connected to the secondary ports D4:7 of each associated DRAM in the other bank. Thus the secondary port D4:7 of DRAM 420 is connected to the secondary port D4:7 of DRAM 430 via a back door communication path 440, the secondary port D4:7 of DRAM 422 is connected to the secondary port D4:7 of DRAM 432 via a back door communication path 442, and so on, and the secondary port D4:7 of DRAM 424 is connected to the secondary port D4:7 of DRAM 434 via a back door communication path 444. More specifically, back door communication path 440 consists of four individual communication paths, each communication path connecting a data bit of DRAM 420 to an associated data bit of DRAM 430, such that the back door communication path represents a 4-bit wide communication path to carry 4-bits of memory or ECC data. Similarly, back door communication path 442 consists of four individual communication paths, each communication path connecting a data bit of DRAM 422 to an associated data bit of DRAM 432, such that the back door communication path represents a 4-bit wide communication path to carry 4-bits of memory or ECC data. Likewise, back door communication path 444 consists of four individual communication paths, each communication path connecting a data bit of DRAM 424 to an associated data bit of DRAM 434, such that the back door communication path represents a 4-bit wide communication path to carry 4-bits of memory or ECC data.

When placed into an information handling system similar to information handling system 100, dual-channel DIMM 400 operates similarly to dual-channel DIMMS 120 and 130. As such, in a normal operating mode, command and address data presented to dual-channel DIMM 400 on the command and address bus C/A0 is provided to the first bank of DRAMs 420, 422, and 424 and the data associated with the memory transaction is transferred via the data bus D0. Similarly, in the normal operating mode, command and address data presented to dual-channel DIMM 400 on the command and address bus C/A1 is provided to the second bank of DRAMs 430, 432, and 434 and the data associated with the memory transaction is transferred via the data bus D1. Dual-channel DIMM 400 also operates in a HA mode to access data associated with a failed channel by providing command and address information presented on one command and address bus to the DRAMs associated with the opposite bank of DRAMs, and to place the other bank of DRAMs into the pass-through mode to provide the data from memory locations associated with the failing channel to the memory controller on the non-failing channel, as described above. Note that here, in the HA mode, writes to the lower nibble (D0:3) of the DRAM devices of the functioning channel are driven out on the higher nibble (D4:7) to the DRAM devices of the failing channel, and that on reads, the read data is driven out of the higher nibble (D4:7) of the DRAM devices of the failing channel to be presented on the lower nibble (D0:3) of the DRAM devices of the functioning channel.

Note that the DRAM configuration illustrated by dual-channel DIMM 400 is exemplary, and other configurations of DRAMs, DRAM layout, back door communication paths, and the like, may be utilized, as needed or desired. For example, dual-channel DIMM 400 may also be representative of a single sided DIMM with DRAMs only on one side of the DIMM, of a double sided DIMM with DRAMs on both sides of the DIMM, of a DIMM including Three-Dimensional Stacked (3DS) DRAMs, or other configurations, as needed or desired. Further, back door communication paths 440, 442, and 444 are also exemplary, and other configurations may be utilized, as needed or desired. Moreover, the addition of back door communication paths 440, 442, and 444 may necessitate the addition of one or more signal layers in a printed circuit board that is provided to implement dual-channel DRAM 400. Note that various design tradeoffs may be presented in the design of dual-channel DRAM 400. For example, the trace routing for back door communication paths may be simplified by matching a DRAM on a first side of the printed circuit board with a DRAM in a same location on a second side of the printed circuit board. Also note that, depending upon how the ECC data is calculated in dual-channel DIMM, the implementation of the HA mode may also necessitate translation of the data information, address information, or control information, in order for the ECC data to be correctly calculated in the dual-channel DIMM or in the memory controller.

Figure 5:
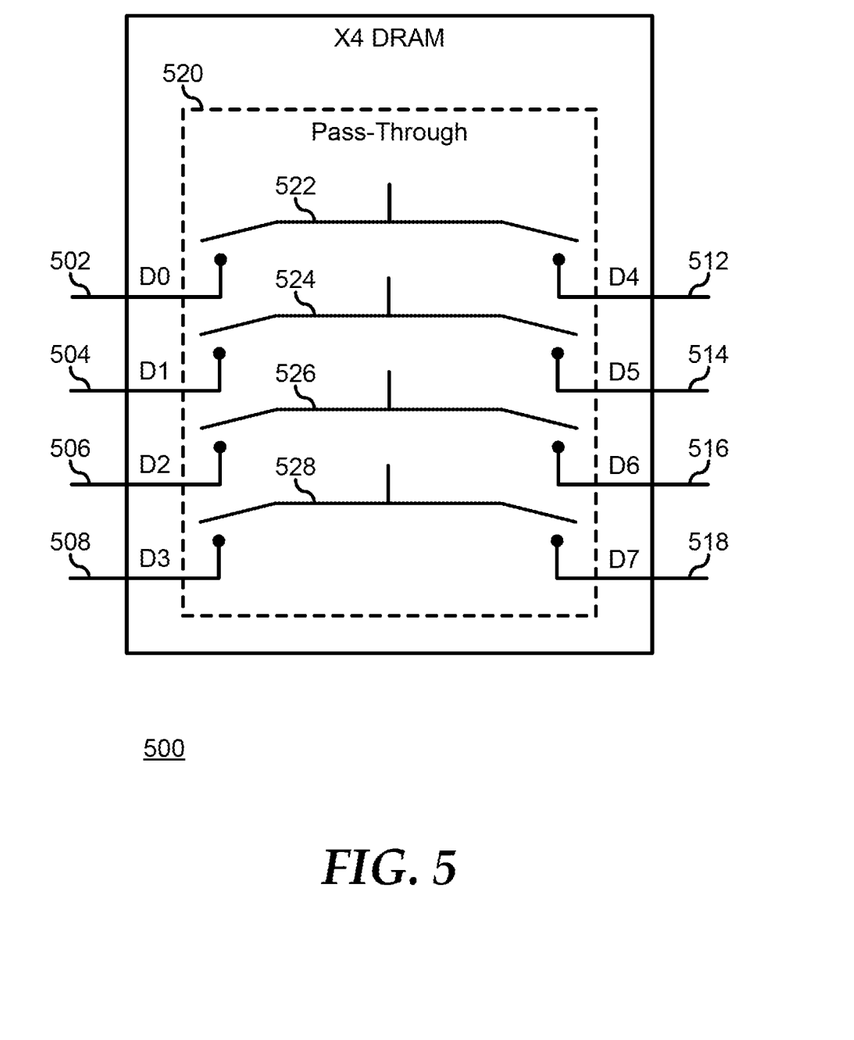
FIG. 5 is a block diagram illustrating a four-bit (×4) Dynamic Random Access Memory (DRAM) that provides a high availability passthrough mode according to an embodiment of the present disclosure.

FIG. 5 illustrates a four-bit (×4) DRAM 500 that provides a pass-through mode, such as may be utilized in one or more of dual-channel DIMMS 120, 130, and 400. DRAM 500 includes a primary data port D0:3 that includes a data bit 502 (D0), a data bit 504 (D1), a data bit 506 (D2), and a data bit 506 (D3). DRAM 500 also includes a secondary data port D4:7 that includes a data bit 512 (D4), a data bit 514 (D5), a data bit 516 (D6), and a data bit 516 (D7). DRAM 500 further includes a pass-through 520 that provides a connection 522 between data bit 502 and data bit 512, a connection 524 between data bit 504 and data bit 514, a connection 526 between data bit 506 and data bit 516, and a connection 528 between data bit 508 and data bit 518. When a pass-through mode is set on DRAM 500, the data presented on the primary data port is passed through to the secondary data port, and the data presented on the secondary data port is passed through to the primary data port.

Figure 6:
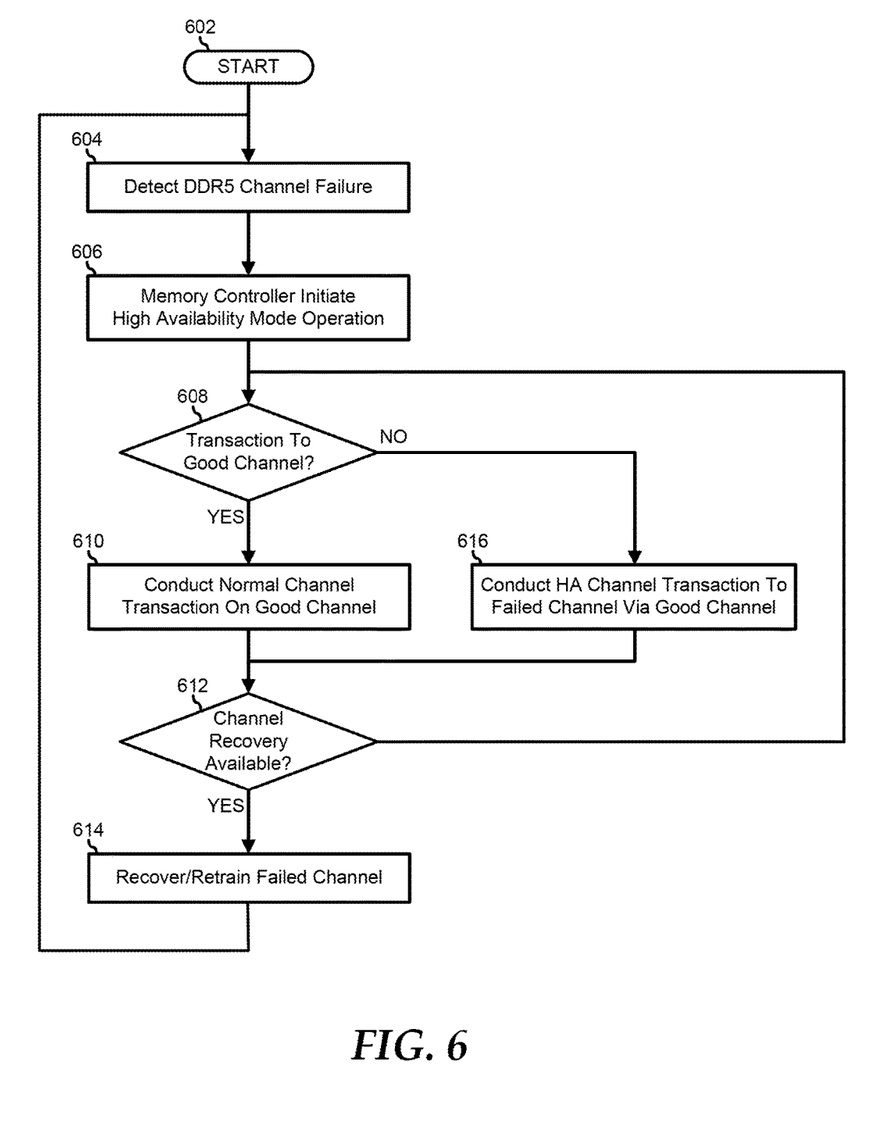
FIG. 6 is a flowchart illustrating a method of utilizing a back door communication path in a dual-channel DIMM in the event of a channel failure according to an embodiment of the present disclosure.

FIG. 6 is a flowchart illustrating a method of utilizing a back door communication path in a dual-channel DIMM in the event of a channel failure, starting at block 602. A channel failure is detected in block 604. For example, a memory controller in an information handling system, or a RCD in a dual-channel DIMM can detect that a particular channel is unable to reliably transfer data between the memory controller and the DRAMs of the dual-channel DIMM. The memory controller initiates a HA mode of operation on the dual-channel DIMM in block 606. A decision is made as to whether or not a next memory transaction to the dual-channel DIMM with the failed channel is directed to a memory location associated with the non-failing channel in decision block 608. If so, the "YES" branch of decision block 608 is taken, a normal channel transaction is performed on the non-failing channel in block 608 and the method proceeds to block 612, as described below. If the next memory transaction to the dual-channel DIMM with the failed channel is not directed to a memory location associated with the non-failing channel, the "NO" branch of decision block 608 is taken, a HA channel transaction is performed to access the memory location associated with the failed channel via a back door communication path on the dual-channel DIMM in block 616, and the method proceeds to block 612, as described below.

A decision is made as to whether or not the failed channel can be recovered in decision block 612. For example, the memory controller can attempt to retrain the failed channel after a pre-determined length of time to determine if the use of the failed channel can be restored. If not, the "NO" branch of decision block 612 is taken and the method returns to decision block 608 where a the decision is again made as to whether or not the next memory transaction to the dual-channel DIMM with the failed channel is directed to a memory location associated with the non-failing channel. If the failed channel can be recovered, the "YES" branch of decision block 612 is taken, the failed channel is recovered and retrained in block 614, and the method returns to block 604 where a channel failure is detected.

Figure 7:
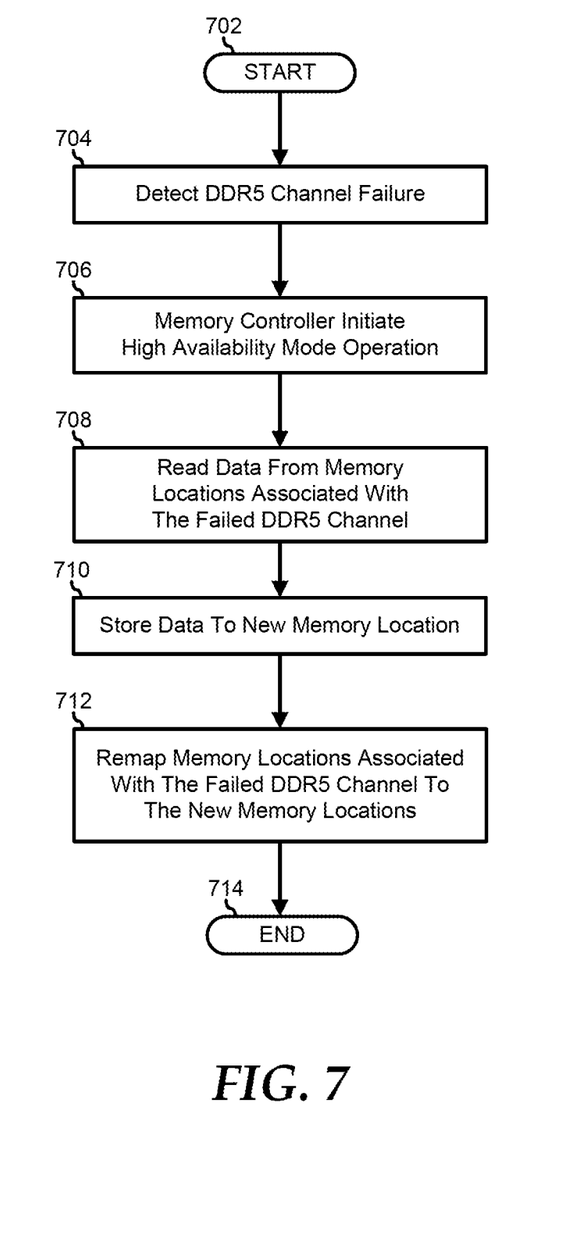
FIG. 7 is a flowchart illustrating another method of utilizing a back door communication path in a dual-channel DIMM in the event of a channel failure according to an embodiment of the present disclosure.

FIG. 7 is a flowchart illustrating another method of utilizing a back door communication path in a dual-channel DIMM in the event of a channel failure starting at block 702. A channel failure is detected in block 704. A memory controller initiates a HA mode of operation on the dual-channel DIMM in block 706. The memory controller reads the data at the memory locations associated with the failed channel via the back door communication path on the dual-channel DIMM in block 608. The memory controller stores the data from the memory locations associated with the failed channel at new memory locations in block 710. The memory locations associated with the failed channel are remapped to the new memory locations in block 712, and the method ends in block 714.

When an information handling system is powered on, the memory controller operates to train the channels to ensure that various channel electrical and timing parameters are set to maximize the BER between the dual-channel DIMMs and the memory controller. Such training is typically performed during a Power On Self Test (POST) of the information handling system, and can also be performed at various times during the run-time operations of the information handling system, such as when the BER on a particular channel drops below a pre-determined threshold. As dual-channel DIMMs are accessed via two channels, the training can include read training while both channels are performing reads (R/R training), read training on one channel while performing a write on the other channel (R/W training) or while the other channel is idle (R/Idle training), write training on one channel while performing a read on the other channel (W/R training) or while the other channel is idle (W/Idle training), and write training while both channels are performing writes (W/W training).

The inclusion of a back door communication path on a dual-channel DIMM leads to increased demands on the channel training requirements. In particular, the training of the back door communication path must be done at least at POST, and should not be left until a run time failure of a channel occurs. The training of the back door communication path provides for read and write training from the memory controller to one bank of DRAMs set to the pass through mode and through the back door communication path to the other bank of DRAMs. Note that, because read and write operations to the memory locations associated with the failed channel in the HA mode involve both banks of DRAMs, there is no need to perform mixed read/write training.

Figure 8:
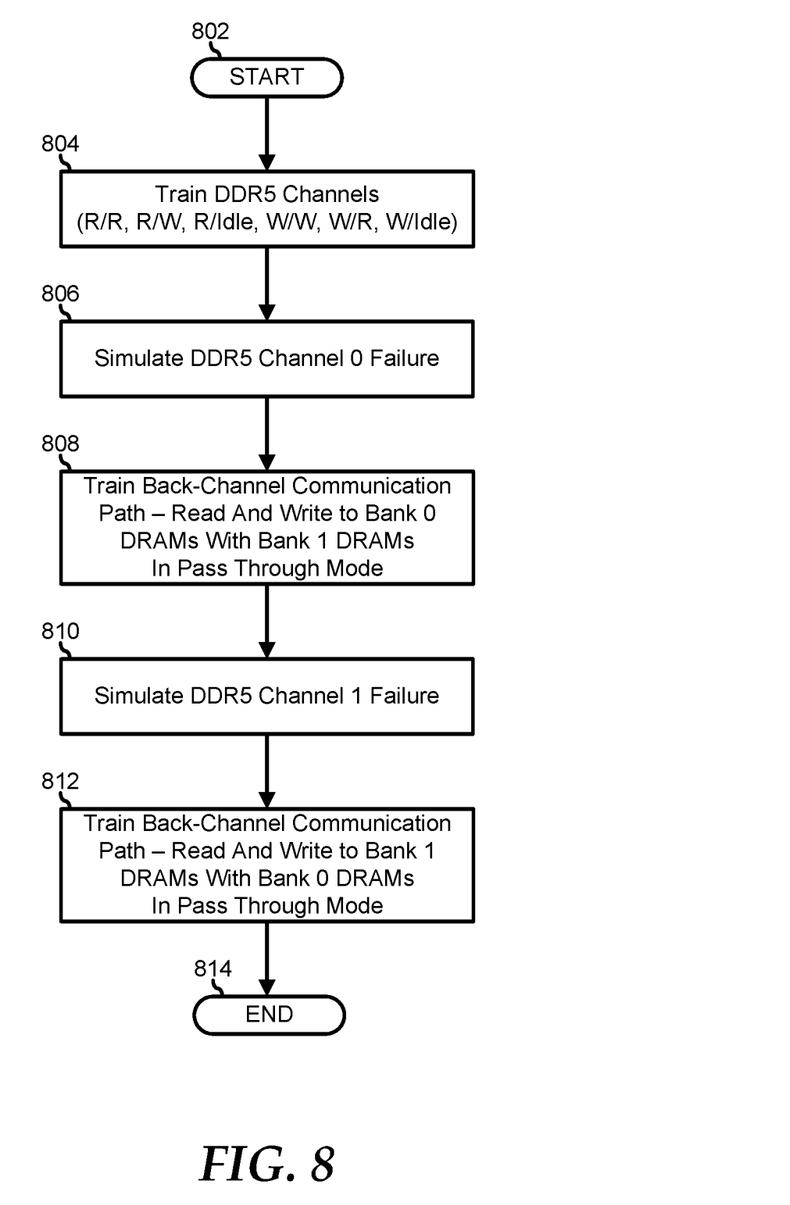
FIG. 8 is a flowchart illustrating a method of training a dual-channel DIMM that includes a back door communication path according to an embodiment of the present disclosure.

FIG. 8 is a flowchart illustrating a method training a dual-channel DIMM that includes a back door communication path, starting at block 802. A memory controller trains the channels that are populated with a dual-channel DIMM in block 804. The channel training can include R/R training, R/W training, R/Idle training, W/W training, W/R training, and W/Idle training. Moreover, the training can be initiated at POST or at another time, as needed or desired. In a particular embodiment, the method includes a decision block, not illustrated, where the memory controller determines whether or not any of the dual-channel DIMMs provide a back door communication path prior to proceeding with the subsequent steps illustrated in the method, and if not, then the method ends.

The memory controller simulates a channel failure on a channel 0 for a dual-channel DIMM that provides a back door communication path in block 806. The memory controller then performs read and write training on the back door communication path in block 808. Here, the memory controller performs reads and writes on memory locations associated with the simulated failed channel 0 via the back door communication path with the DRAMs associated with the non-failed channel 1 set in the pass through mode. The memory controller then simulates a channel failure on a channel 1 for the dual-channel DIMM in block 810, and performs read and write training on the back door communication path in block 812. Here, the memory controller performs reads and writes on memory locations associated with the simulated failed channel 1 via the back door communication path with the DRAMs associated with the non-failed channel 0 set in the pass through mode. The method ends in block 814. In a particular embodiment, the method includes a decision block, not illustrated, where the memory controller determines whether or not the trained dual-channel DIMM is the last dual-channel DIMM that provides a back door communication path. If not, the method returns to block 806 were the memory controller simulates a failure on a channel 0 of the next dual-channel DIMM. If the trained dual-channel DIMM is the last dual-channel DIMM that provides a back door communication path, then the method ends in block 814.

Figure 9:
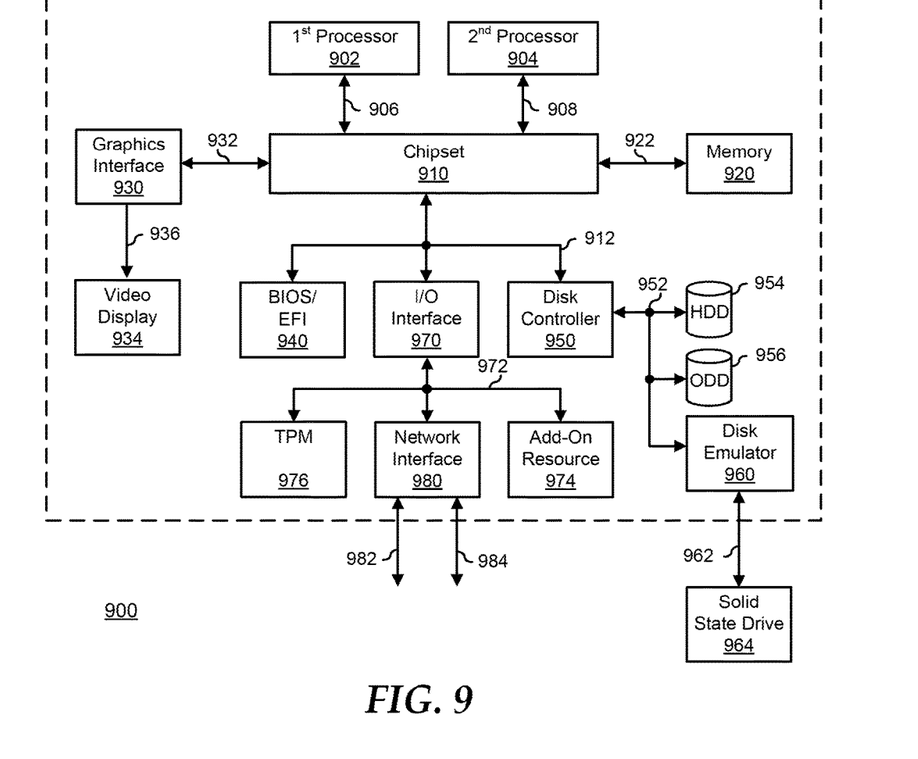
FIG. 9 is a block diagram illustrating a generalized information handling system according to an embodiment of the present disclosure.

FIG. 9 illustrates a generalized embodiment of information handling system 900. For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described above, and operates to perform one or more of the methods described above. Information handling system 900 includes a processors 902 and 904, a chipset 910, a memory 920, a graphics interface 930, include a basic input and output system/extensible firmware interface (BIOS/EFI) module 940, a disk controller 950, a disk emulator 960, an input/output (I/O) interface 970, and a network interface 980. Processor 902 is connected to chipset 910 via processor interface 906, and processor 904 is connected to the chipset via processor interface 908. Memory 920 is connected to chipset 910 via a memory bus 922. Graphics interface 930 is connected to chipset 910 via a graphics interface 932, and provides a video display output 936 to a video display 934. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high speed PCI-Express (PCIe) interface, another industry standard or proprietary communication interface, or a combination thereof. Chipset 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 940 includes BIOS/EFI code operable to detect resources within information handling system 900, to provide drivers for the resources, initialize the resources, and access the resources. BIOS/EFI module 940 includes code that operates to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 964 to be connected to information handling system 900 via an external interface 962. An example of external interface 962 includes a USB interface, an IEEE 1394 (Firewire) interface, a proprietary interface, or a combination thereof. Alternatively, solid-state drive 964 can be disposed within information handling system 900.

I/O interface 970 includes a peripheral interface 972 that connects the I/O interface to an add-on resource 974, to a TPM 976, and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as chipset 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A dual-channel Dual In-Line Memory Module (DIMM), comprising:
    a first bank of Dynamic Random Access Memory (DRAM) devices configured to provide a first memory transaction on the first memory channel of a memory controller of an information handling system;
    a second bank of DRAM devices configured to provide a second memory transaction on the second memory channel of the memory controller; and
    a plurality of back door communication paths, each back door communication path being between a first data bit of the first bank of DRAM devices and a second data bit of the second bank of DRAM devices, the first data bit corresponding to a particular address on the first memory channel and the second data bit corresponding to the particular address on the second memory channel.

2. The dual-channel DIMM of claim 1, wherein the dual-channel DIMM is configured to provide the first memory transaction on the second memory channel in response to determining that the first memory channel has failed to provide the first memory transaction, wherein data associated with the first memory transaction is communicated between the first bank of DRAM devices and the second bank of DRAM devices to the second memory channel via the plurality of back door communication paths.

3. The dual-channel DIMM of claim 2, further comprising:
    a Register Control Device (RCD) configured in a normal operating mode to:
        receive first command and address information associated with the first transaction on the first memory channel,
        provide the first command and address information to the first bank of DRAM devices
        receive second command and address information associated with the second on the second memory channel; and
        provide the second command and address information to the second bank of DRAM devices.

4. The dual-channel DIMM of claim 3, wherein the RCD is further configured to provide the first command and address information to the second bank of DRAM devices in further response to determining that the first memory channel has failed to provide the first memory transaction.

5. The dual-channel DIMM of claim 1, wherein each DRAM device of the first and second banks of DRAM devices is configured as a two-port device, each DRAM device having a first port and a second port.

6. The dual-channel DIMM of claim 5, wherein, in providing the plurality of back door communication paths, the dual-channel DIMM is configured such that each first port of each DRAM device of the first bank of DRAM devices is connected to a first port of a corresponding DRAM device of the second bank of DRAM devices.

7. The dual-channel DIMM of claim 6, wherein:
    the first bank of DRAM devices is configured such that each second port of each DRAM device of the first bank of DRAM devices provides memory transactions to the first memory channel; and
    the second bank of DRAM devices is configured such that each second port of each DRAM device of the second bank of DRAM devices provides memory transactions to the second memory channel.

8. The dual-channel DIMM of claim 7, wherein each DRAM device of the first and second banks of DRAM devices is further configured to provide a pass-through mode, wherein, in the pass-through mode, first data presented on each first port is passed through each DRAM device to each second port, and second data presented on each second port is passed through each DRAM device to each first port, wherein the pass-through mode is in response to a failure on one of the first and second memory channels.

9. The dual-channel DIMM of claim 5, wherein each DRAM device of the first and second banks of DRAM devices is further configured to provide four-bits of data.

10. The dual-channel DIMM of claim 9, wherein the dual-channel DIMM comprises one of an unbuffered DIMM, a registered DIMM, a load reduced DIMM, and a storage class memory DIMM.

11. A method of providing a dual-channel Dual In-Line Memory Module (DIMM), the method comprising:
    providing a first bank of Dynamic Random Access Memory (DRAM) devices of the dual-channel DIMM, the first bank of DRAM devices to conduct a first memory transaction on a first memory channel of a memory controller of an information handling system;
    providing a second bank of DRAM devices of the dual-channel DIMM, the second bank of DRAM devices to conduct a second memory transaction on a second memory channel of the memory controller; and
    providing a plurality of back door communication paths, each back door communication path being between a first data bit of the first bank of DRAM devices and a second data bit of the second bank of DRAM devices, the first data bit corresponding to a particular address on the first memory channel and the second data bit corresponding to the particular address on the second memory channel.

12. The method of claim 11, wherein, in response to determining that the first memory channel has failed to provide the first memory transaction, the method further comprises:
    configuring the dual-channel DIMM to conduct the first memory transaction on the second memory channel; and
    communicating data associated with the first memory transaction between the first bank of DRAM devices and the second bank of DRAM devices to the second memory channel via the plurality of back door communication paths.

13. The method of claim 12, further comprising:
    providing a Register Control Device (RCD) of the dual-channel DIMM;
    receiving, by the RCD, first command and address information associated with the first transaction on the first memory channel in a normal operating mode;
    providing, by the RCD, the first command and address information to the first bank of DRAM devices in the normal operating mode;

receiving, by the RCD, second command and address information associated with the second transaction on the second memory channel in the normal operating mode; and providing, by the RCD, the second command and address information to the second bank of DRAM devices in the normal operating mode.

14. The method of claim 13, further comprising:

providing, by the RCD, the first command and address information to the second bank of DRAM devices in further response to determining that the first memory channel has failed to provide the first memory transaction.

15. The method of claim 11, wherein each DRAM device of the first and second banks of DRAM devices is configured as a two-port device, each DRAM device having a first port and a second port.

16. The method of claim 15, wherein, in providing the plurality of back door communication paths, the method further comprises:

connecting each first port of each DRAM device of the first bank of DRAM devices to a first port of a corresponding DRAM device of the second bank of DRAM devices.

17. The method of claim 16, further comprising:

conducting the first memory transaction via each second port of each DRAM device of the first bank of DRAM devices; and conducting the second memory transaction via each second port of each DRAM device of the second bank of DRAM devices.

18. The method of claim 17, further comprising:

configuring each DRAM device of the first and second banks of DRAM devices to provide a pass-through mode, wherein, in the pass-through mode, first data presented on each first port is passed through each DRAM device to each second port, and second data presented on each second port is passed through each DRAM device to each first port, wherein the pass-through mode is in response to a failure on one of the first and second memory channels.

19. The method of claim 15, wherein each DRAM device of the first and second banks of DRAM devices is further configured to provide four-bits of data.

20. An information handling system, comprising;

a memory controller for dual-channel Dual In-Line Memory Module (DIMM), the memory controller configured to provide memory transactions on a first memory channel and a second memory channel; and a dual-channel DIMM comprising:

a first bank of Dynamic Random Access Memory (DRAM) devices configured to provide a first memory transaction on the first memory channel;

a second bank of DRAM devices configured to provide a second memory transaction on the second memory channel; and a plurality of back door communication paths, each back door communication path being between a first data bit of the first bank of DRAM devices and a second data bit of the second bank of DRAM devices, the first data bit corresponding to a particular address on the first memory channel and the second data bit corresponding to the particular address on the second memory channel.

* * * * *